United States Patent Office 3,412,627
Patented Nov. 26, 1968

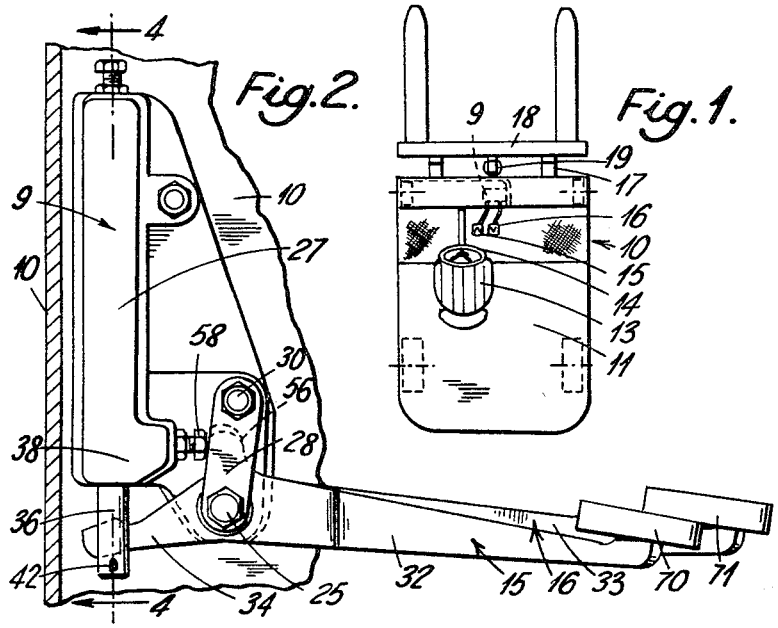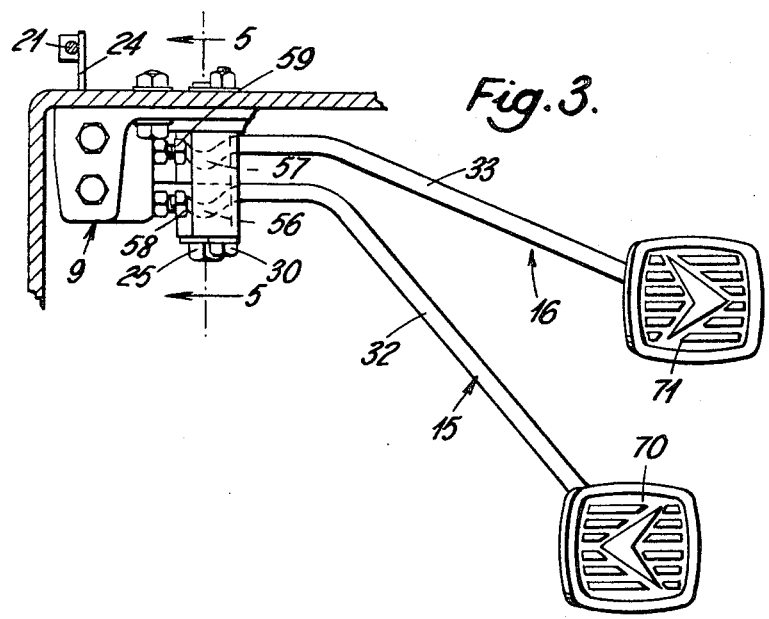

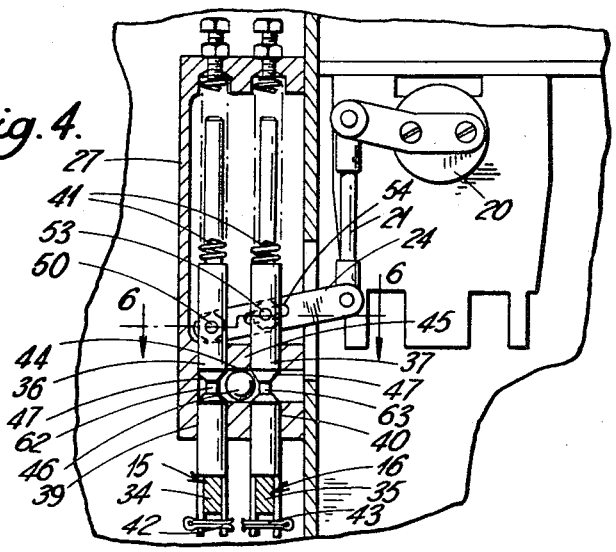
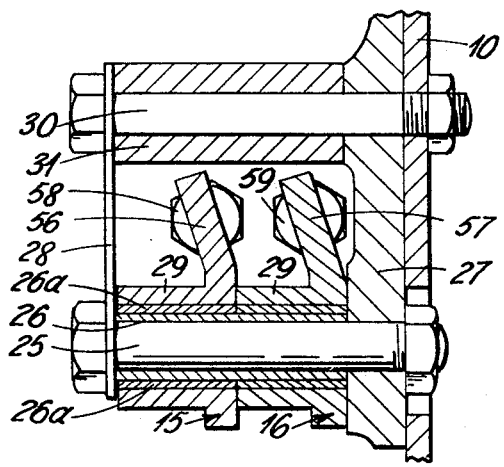
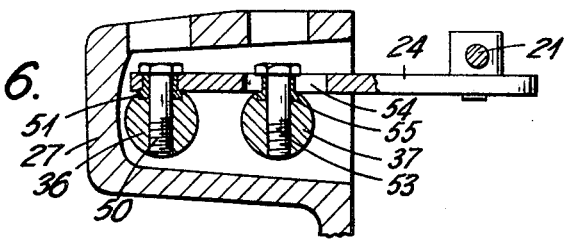

3,412,627
PEDAL CONTROL MECHANISMS
Ronald Goodacre, Basingstoke, England, assignor to Lansing Bagnall Limited, Basingstoke, England, a British company
Filed Feb. 7, 1967, Ser. No. 614,425
Claims priority, application Great Britain, Feb. 9, 1966, 5,730/66
7 Claims. (Cl. 74—483)

ABSTRACT OF THE DISCLOSURE

A pedal control mechanism for a vehicle comprises two independently movable pedals and an interlock device which prevents both pedals being operated together. The pedals also operate a single lever connected to control means, e.g. direction and speed control means, on the vehicle.

---

This invention relates to pedal control mechanisms for vehicles and more particularly, though not essentially, to control pedals for an industrial truck, which pedals control the direction of movement of the vehicle and, it may be, the rate of movement at least to a limited extent.

According to the invention a pedal control mechanism for a vehicle comprises two pedals each of which is independently movable between an inoperative and an operative position and an interlock device which prevents each pedal being moved from its inoperative position effectively to or towards its operative position unless the other pedal is in its inoperative position and also prevents both pedals being moved simultaneously from their inoperative positions towards their operative positions.

The interlock device may comprise a captive ball, roller or like member secured in grooves or opposed notches in opposed parts of the pedals or members movable therewith.

Preferably the spacing of the said opposed parts of the pedals or members movable therewith is less than the diameter of the captive ball by an amount which is at least equal to the depth to which the ball can enter either of the grooves or opposed notches.

It is preferred that the pedals operate a lever of which one end has a pivotal connection to one pedal or a part movable therewith and intermediate in the length of the lever there is a pivotal connection to the other pedal or a part movable therewith whereby movement of either pedal rocks the lever about the connection to the other pedal (or part) as a fulcrum and the lever rocks in opposite directions according to which of the pedals is operated. The other end of the lever is preferably connected to control means for the vehicle which means are thereby operated indirectly by the pedals and which means, on depression of each pedal from its inoperative position, first determines the direction of movement of the vehicle and then, on further depression of the pedal, increases the speed of the vehicle, one of the pedals being associated with means for moving the vehicle in a forward direction and the other pedal being associated with means for moving the vehicle in reverse.

It is also preferred that each pedal has a part movable therewith, the captive ball and/or the said lever is associated with the parts movable with the pedals and means are provided for urging said movable parts and their respective pedals towards their inoperative positions. Further means may also be provided whereby each pedal can return the part movable therewith to its inoperative position, which further means are independent of the aforesaid means urging the said movable parts towards their inoperative positions.

By way of example, a specific embodiment in accordance with the invention will now be described with reference to the accompanying drawings in which:

FIGURE 1 is a plan view of a truck having the pedal control mechanism shown in FIGURE 2 to 5;

FIGURE 2 is an elevation of a two pedal control mechanism having an interlock to prevent simultaneous action of both pedals;

FIGURE 3 is a plan view of the mechanism shown in FIGURE 2;

FIGURE 4 is a section along the line 4—4 in FIGURE 2, this figure also showing part of the accelerator assembly that is operated by the pedal control mechanism;

FIGURE 5 is a section along the line 5—5 in FIGURE 3; and

FIGURE 6 is a section along the line 6—6 in FIGURE 4.

With reference to FIGURE 1, an industrial truck comprises a body portion 10 having a power unit 11, comprising a reversible electric motor operated by a pair of batteries or battery sections, and a forwardly-directed operator seat 13. The driving controls are also mounted on the body portion 10 and these controls include a steering wheel 14 and two pedals 15, 16 which determine whether the truck is driven in a forward or reverse direction and, in addition, the speed of the truck, the pedal 15 effecting forward movement of the truck and the pedal 16 effecting reverse movement of the truck.

Mounted on the forward end of the body portion 10, there is a mast unit 17 carrying a fork load-lifting carriage 18 and a jack 19 for moving the carriage up and down the mast unit 17.

This invention relates to a control mechanism 9 for the aforesaid direction and accelerator pedals 15, 16 and thus the remainder of this description will be limited thereto, the above short description of the truck illustrating one type of vehicle which is well-known in itself and in which the following pedal control mechanism may be used to advantage.

With reference to FIGURES 2 to 6, the pedal control mechanism 9 is used to operate an accelerator assembly 20 (see FIGURE 4), the direction of movement and speed control being provided for by electrical means or by hydraulic means. In the latter case, the means may comprise a pump and swash-plate, the angle of the swash-plate determining the output of the pump and hence the speed of the truck. In either case the said means is operated by substantially longitudinal movement of a rod 21, in the latter case the operation being effected through servo-mechanism. Movement of the rod in one direction will determine the direction of the truck and further movement will increase its speed. Likewise movement of the rod in the opposite direction will reverse the movement of the truck, increased speed in this direction being effected by further movement of the rod in this opposite direction.

The movement of the rod 21 is effected by one of the two pedals 15, 16 which are indirectly connected to the rod in a maner which will be described below. The pedals 15, 16 are pivotally mounted on a sleeve 26 (see FIGURE 5) carried by a bolt 25, the bolt extending between the body part 27 of the pedal control mechanism and one end of a link 28, the said end of the link being held in spaced relation from the body part 27 by the sleeve 26. As can be seen from FIGURE 5, the pedals are provided with bosses 29 having internal bushes 26a for pivotal movement on the sleeve 26. The other end of the link 28 is also held in spaced relation from the body part 27 by a second bolt 30 and surrounding sleeve 31, the bolt 30 also passing through a hole in the body portion 10 of the truck and comprising means for fixing the body part 27 of the pedal control mechanism to the body portion of the truck.

Each pedal 15, 16 is constructed as a cranked lever pivotally mounted about the axis of the bolt 25, each lever having one arm 32, 33 carying a pedal pad 70, 71 whereby the pedal can be depressed by the truck driver, the other arm 34, 35 extending beyond the pivot axis of the bolt 25 and engaging within the forked end of the respective vertical rods 36, 37. The rods 36, 37 pass through guide holes 39, 40 in a boss 38 of the body part 27 and are raised by the arms 34, 35 of the pedals 15, 16 on depression of the pedals. Return movement of each rod 36, 37 is effected by a spring 41 surrounding an extension of the respective rod, which spring thereby also returns the respective pedal to its raised or inoperative position. Split pins 42, 43 are provided to retain the arms 34, 35 within the forked ends of the rods 36, 37, the pins also providing means by which the pedals can return the associated rods 36, 37 to their lowered or inoperative positions should the rods 36, 37 remain in their raised positions on movement of the pedals to their inoperative positions.

In order to render it impossible for the driver of the truck to depress both pedals 15, 16 simultaneously or to depress one of the pedals when the other pedal is partially or fully depressed, the rods 36, 37 are provided with circumferential grooves 62, 63 (see FIGURE 4), which grooves communicate with a port 44 in the wall 45 of the boss 38 lying between the guide holes 39, 40 when both the rods 36, 37 are in their lowered positions, which port 44 houses a ball 46, the diameter of the ball being such that it will project out of the port on both sides into each groove 62, 63 or can be moved to one side or the other so that it only projects from the port on that side. This movement of the ball can be effected by the lead surfaces 47 provided by the groove 62, 63 of one of the rods 36, 37 but if an attempt is made to move both rods 36, 37 simultaneously, the ball will be positioned so that it projects from both sides of the port 44 and neither rod will be moved. Likewise, once one of the rods has been moved from its lowered position the other rod cannot be moved until the first rod has been returned to its lowered position. The ball 46 thus operates as an interlock device to prevent simultaneous movement of both pedals 15, 16.

As stated above, the movement of the rod 21 operating the accelerator assembly 24 is effected by one of the two pedals 15, 16. The means for effecting such movement comprises the aforesaid rods 36, 37 and a lover 24 which connects the rod 21 to the rods 36, 37 in the following manner (see FIGURES 4 and 6). First, with regard to the rod 36, the lever 24 is pivotally connected to the rod 36 by a bolt 50 passing through a hole in the lever 24 and being in threaded engagement with the rod 36, the shank of the bolt being surrounded by a bush 51 having a flange housed within a recess in the rod 36. Similar bolt means 53 are also provided for pivotally mounting the rod 37 to the lever 24 but, in this case, the bolt 53 passes through a slot 54 extending lengthwise of the lever 24 and the portion of the bush 55 which projects into the slot 54 is provided with flats for engagement with the straight sides of the slot 54. In operation, upward movement of the rod 36, which is made possible by virtue of the slot 54, will pivot the lever 24 and the bush 55 about the bolt 53, which bolt 53 attaches the lever 24 to the rod 37, and hence effect downward movement of the rod 21. On the other hand, upward movement of the rod 37 will pivot the lever 24 and the bush 51 about the bolt 50, which bolt 50 attaches the lever 24 to the rod 36, and effect upward movement of the rod 21. Since, as stated above, the rod 21 operates the accelerator assembly 20, depression of one of the pedals 15, 16 will cause the truck to move forward and the other pedal will cause the truck to move in reverse, further depression of each pedal effecting further longitudinal movement of the rod and hence increased speed of the truck.

Each pedal 15, 16 is also provided with a projection 56, 57 extending substantially upwardly from its pivotal point for engagement with an adjustable stop 58, 59 to locate the raised or inoperative positions of the pedals.

It is to be appreciated that the control mechanism of this invention is not restricted to its use on industrial trucks but is applicable to any vehicle or machine etc., having two pedals. Also the ball 46 may be replaced by, for example, a roller or a rod having rounded ends, the curved sides of the roller or the rounded ends of the rod being aligned with the grooves 62, 63 provided in the rods 36, 37. Furthermore, the said grooves 62, 63 may be replaced by opposed notches, the rods 36, 37 being assembled in the guide holes 39, 40 so that the notches in the rods face each other.

The construction described above may also be modified so that the lever 24 is connected to the pedals 15, 16 instead of to the rods 36, 37. In such a case the locking member (i.e. the ball or like member 46) of the interlock may also be located in grooves or opposed notches in opposed parts of the pedals.

I claim:

1. A pedal control mechanism for a vehicle comprising two pedals each of which is independently movable between an inoperative and an operative position, an interlock device which prevents each pedal being moved from its inoperative position effectively towards its operative position unless the other pedal is in its inoperative position and also prevents both pedals being moved simultaneously from their inoperative positions towards their operative positions, and a lever having one end pivotally connected to one of the pedals and having a pivotal connection at a point intermediate the ends of the lever to the other pedal whereby movement of either pedal rocks the lever about the connection to the other pedal as a fulcrum and the lever rocks in opposite directions according to which of the pedals is operated.

2. A mechanism as claimed in claim 1 in which the other end of the lever is connected to control means for the vehicle which means are thereby operated indirectly by the pedals and which means, on depression of each pedal from its inoperative position, first determines the direction of movement of the vehicle and then, on further depression of the pedal, increases the speed of the vehicle, one of the pedals being associated with means for moving the vehicle in a forward direction and the other pedal being associated with means for moving the vehicle in reverse.

3. A mechanism as claimed in claim 1 in which the lever is pivotally connected at its said one end to a member movable with the said one pedal and is pivotally connected at the said point intermediate the ends of the lever, to a second member which is movable with the said other pedal, the said members thereby comprising extensions of the two pedals respectively.

4. A mechanism as claimed in claim 3 in which the interlock device comprises notches provided in opposed parts of the said members which notches, in the inoperative position of the pedals, are aligned with an enclosure in a stationary member located between said notches, and a ball held captive by the enclosure for selective engagement with the notches.

5. A mechanism as claimed in claim 4 in which the spacing of the said opposed parts of the said members is less than the diameter of the captive ball by an amount which is at least equal to the depth to which the ball can enter either of the notches.

6. A mechanism as claimed in claim 3 in which means are provided for urging said members and their respective pedals towards their inoperative positions.

7. A mechanism as claimed in claim 6 in which further means are provided whereby each pedal can return the member movable therewith to its inoperative position, which further means are independent of the aforesaid means urging the said members towards their inoperative positions.

References Cited

UNITED STATES PATENTS

| | | | |
|---|---|---|---|
| 748,156 | 12/1903 | Bement | 74—483 |
| 2,803,969 | 8/1957 | Hester | 74—478 |

FRED C. MATTERN, JR., *Primary Examiner.*

BERNARD T. CALLAHAN, *Assistant Examiner.*